Jan. 9, 1962 K. T. MacMILLAN ETAL 3,015,846
FRAME FOR MOLD

Filed Feb. 3, 1960 3 Sheets-Sheet 1

Inventors
Kenneth T. MacMillan
Ernest A. Millhoff by Will, Sherman, Meroni, Gross & Simpson Attys.

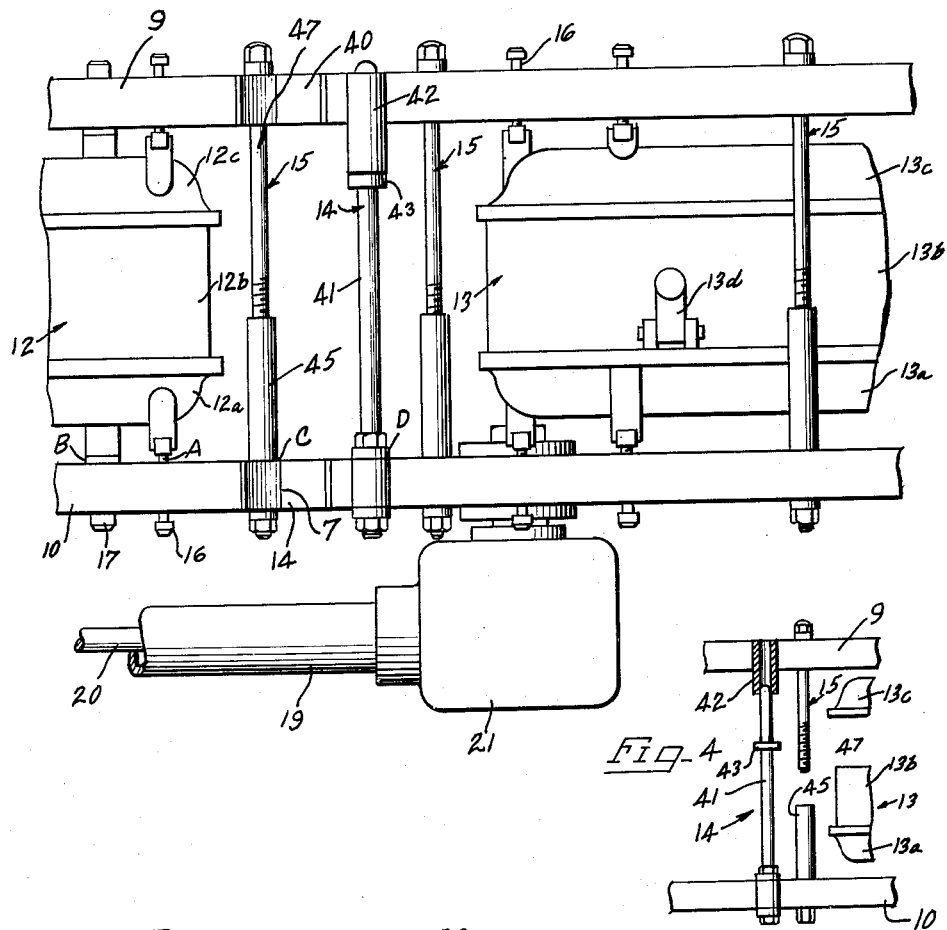
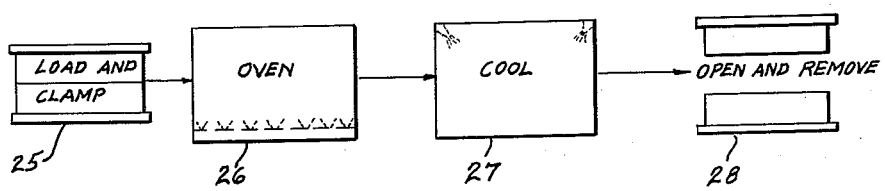

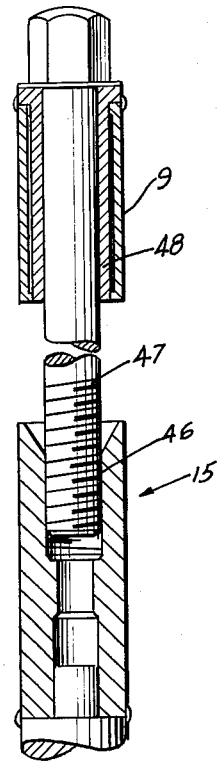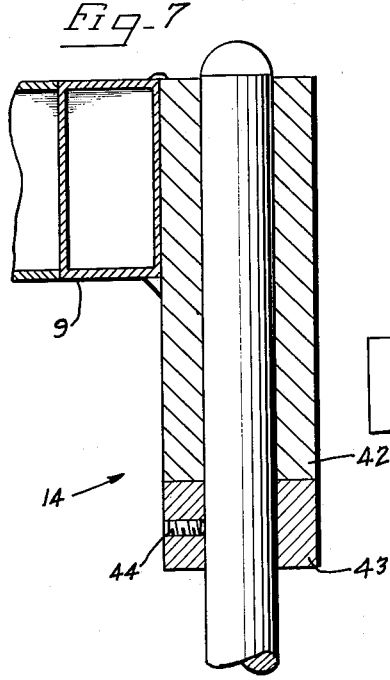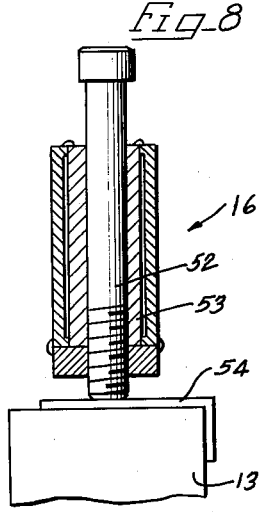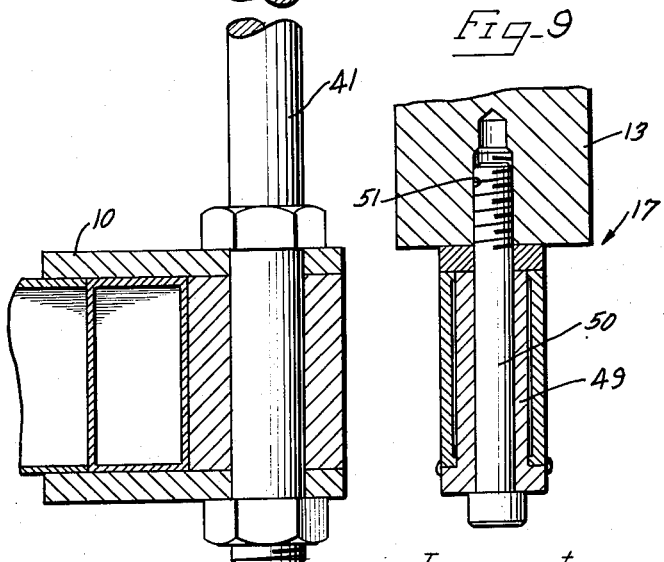

United States Patent Office 3,015,846
Patented Jan. 9, 1962

3,015,846
FRAME FOR MOLD
Kenneth T. MacMillan, Memphis, Tenn., and Ernest A. Millhoff, Doylestown, Ohio, assignors to Wonder Products Company, Collierville, Tenn., a corporation of Tennessee
Filed Feb. 3, 1960, Ser. No. 6,448
10 Claims. (Cl. 18—26)

The present invention relates to improvements in molding apparatus for casting hollow plastic articles from a thermoplastic material and particularly to supports for holding a plurality of molds while casting hollow plastic articles.

In the manufacture of hollow plastic articles such as toys from a solution or dispersion of thermoplastic, mold sections containing a measured quantity of liquid plastic are supported or clamped together. The molds are supported for rotation about a plurality of axes while being heated to cause the plastic to be distributed evenly over the inner surface of a closed mold while the plastic is gelled and cured by the application of heat. The plastic is a polyvinyl synthetic resin preferably polyvinyl chloride with or without a relatively small (5 to 15% by weight) amount of copolymer such as polyvinylidene chloride or polyvinyl acetate. Also, a plasticizer may be used such as tricresyl phosphate. Specifically vinyl chloride (95%)-vinylidene (5%) commercial grade medium copolymer, may be used. For convenience of reference the uncured liquid thermoplastic may be herein referred to as plastic or as plastisol.

In production molding, a plurality of molds are held in a frame or spider and simultaneously treated by being carried through a heated oven of a sufficiently high temperature to gel and fuse the plastic. For example, an oven temperature of over 500° F. may be employed to obtain a fusing temperature of 310° to 350° to fuse or set the plastisol. The supported molds are then conveyed to a cooling chamber wherein they are sprayed with cooling water in order that the mold may be opened to remove the molded articles.

In this production process the physical demands on the molds and frames for supporting the mold are severe. The molds must be supported to provide a circulation of heated air in the heating chamber uniformly over the mold surfaces for uniform heating of the plastic, and the molds must provide a free flow of a cooling liquid thereover during the cooling step of the process. The supporting frames must be capable of withstanding this repeated heating and cooling for continuous periods of operation without requiring frequent adjustment or repair. The mold supporting frames must be capable of continued operation without warpage or disintegration or resultant application of unequal pressures on the mold sections so as to permit the sections to separate and cause leakage of plastic and result in excessive flash on the molded articles. The frame for supporting the molds must have sufficient strength to allow the proper amount of pressure to be applied to the molds to prevent leakage and yet should not absorb unnecessary heat so as to retard the heating of the molds and create uneven heating of the plastic within the molds, and should not be difficult to cool in the cooling chamber to slow operation or remain hot and be dangerous to personnel unloading the molds.

Accordingly, it is an object of the present invention to provide an improved frame or spider for supporting a plurality of mold sections and for applying a closing pressure thereto while the molds are heated for curing a thermoplastic molded article therein and cooled for unloading the mold.

Another object of the invention is to provide an improved frame for supporting plural molds for plastic articles which is capable of applying improved and more uniform individual clamping pressures to the individual molds and will not warp or twist with repeated heating and cooling and will not require continual adjustment and repair.

Another object of the invention is to provide an improved supporting apparatus for molds for hollow plastic articles which is lower in initial cost and easier to maintain, which prevents accidental damage to the molds during closing and opening and is easier on the sealing edges of the mold cavities, and has a smoother more uniform surface, trapping less water and requiring less heat thereby necessitating a shorter time in the oven and enabling more rapid cooling.

Other objects and advantages will become more apparent with the teaching of the principles of the invention in connection with the disclosure of the preferred embodiment thereof in the specification, claims and drawings, in which:

FIGURE 3 is a fragmentary side elevational view showing the molding apparatus in molding position;

FIGURE 4 is a fragmentary side elevational view, shown partially in section, and illustrating the relative positions of the parts as the frames are moved together toward molding position;

FIGURE 5 is a schematic view illustrating the sequence of steps in the molding process;

FIGURE 6 is a detailed vertical sectional view of a locking bolt for holding the frame members together;

FIGURE 7 is a detailed vertical sectional view of the guide members for aligning the frame members;

FIGURE 8 is a detailed vertical sectional view of support bolts for applying pressure to the mold sections; and, FIGURE 9 is a detailed vertical sectional view of support bolts for mounting the mold sections on the frame members.

As shown on the drawings:

Figure 1:
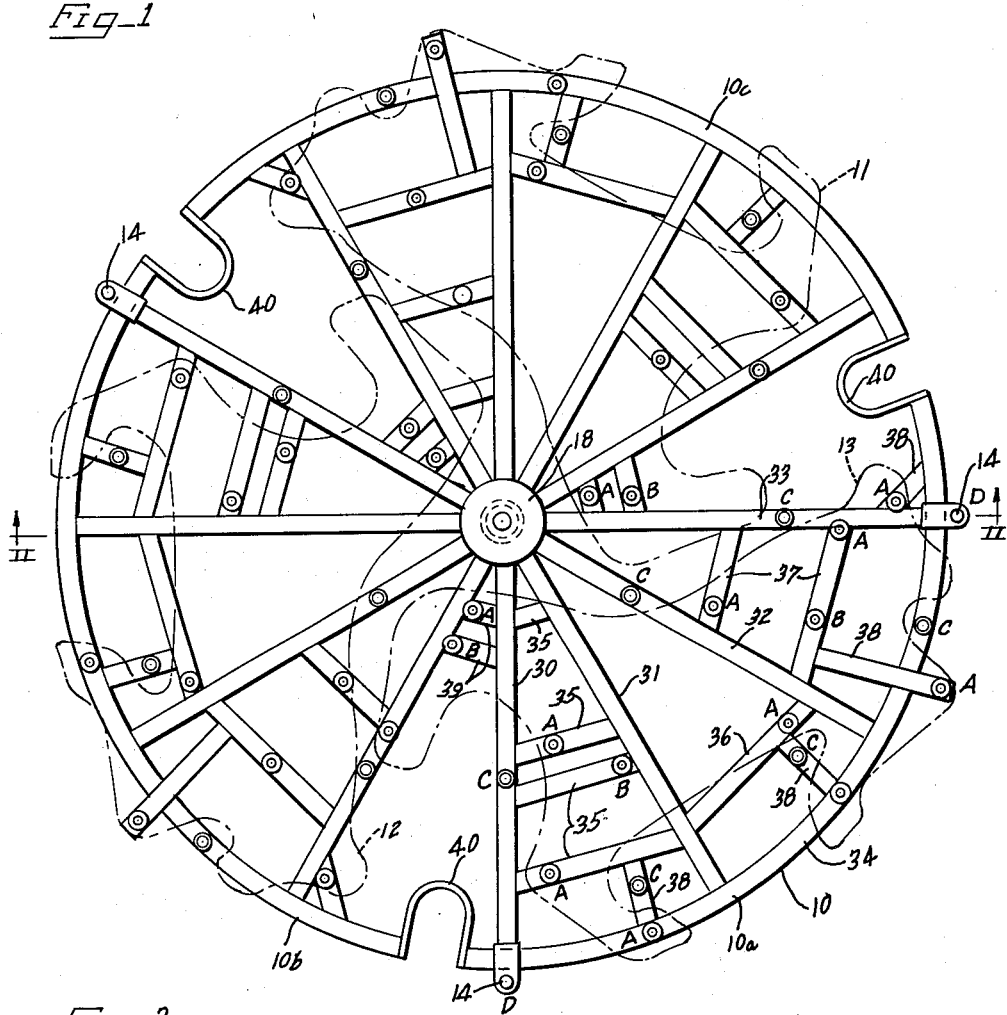
FIGURE 1 is a top plan view of a lower frame for a molding apparatus constructed in accordance with the principles of the present invention.

The molding apparatus, as illustrated in FIGURES 1 and 3 includes upper and lower frames or spiders 9 and 10 which support a plurality of molds 11, 12 and 13 between them. As illustrated in FIGURE 3, the molds are made in sections, and the mold illustrated has a lower section 13a, an intermediate section 13b and an upper section 13c. The intermediate and lower sections of the mold are hinged at 13d. The sections of the mold are supported on the frames 9 and 10 at the locations shown at A and B in FIGURE 1. These supports include pressure members 16, which are shown in detail in FIGURE 8, and which are located on the frame at the points marked A. These pressure members clamp the edges of the mold together when the frame members 9 and 10 are locked in molding position.

The supports for the mold also include mounting members 17, which are shown in detail in FIGURE 9, and which are located at the points marked B on the frame. The mounting members carry the mold sections on the frame members when they are separated for removing the completed molded articles and for pouring fresh plastisol into the molds.

The frame members when being brought together are guided to their oriented positions by mating guide members shown generally at 14 in FIGURES 3 and 4 and located at points D on the frame, as illustrated in FIGURE 1. The guide members are shown in detail in FIGURE 7.

The frame members are locked together to hold them in a fixed spaced position during molding operation, that is, during the time when the molds are heated and cooled, by holding or locking members 15, which are located on the frame members in the locations shown generally at C in FIGURE 1. The locking members are illustrated in detail in FIGURE 6. The points A, B, C and D are located the same in each of the sections 10a, 10b and 10c of the frame so that only one section is marked in FIGURE 1. The locations of these points are also the same for frame 9.

The entire molding assembly with the frame members in molding position, as illustrated in FIGURE 3, is carried on a tubular support arm 19 which has a drive shaft 20 extending therethrough. The support 19 and drive shaft 20 are relatively rotatable so as to rotate the mold assembly and molds about a plurality of axes during the time the molds are being heated so that the plastisol will coat and gel in a relatively even layer on the inner surface of the molds to form the hollow molded article. At the end of the support arm 19 is a housing 21 which encloses a bevel gear 22 on the shaft 20 and a mating driven bevel gear 23 on a stub shaft 24. The stub shaft is tapered and is locked in a hub 18 at the center of the lower frame member 10. The lower frame member is at all times conveniently supported on the arm 19 and the upper frame member can be lifted carrying the upper mold sections 12c and 13c away from the mold assembly so that the intermediate mold sections 12b and 13b can be pivoted to open position relative to the lower mold sections 12a and 13a and the molded article removed.

For the molding operation, a measured amount of plastisol is placed in the molds and the frame members are brought back together and locked by locking members 15 with the assembly being driven in rotation about the two axes while it is carried through a heating oven. The drive illustrated in FIGURES 2 and 3 rotates the mold assembly about a first axis coaxial with the support arm 19 and a second axis coaxial with the stub shaft 24.

As illustrated in FIGURE 5, the frame members are clamped together at the station illustrated at 25 and the mold assembly is moved into a heating chamber or oven 26. The assembly is maintained in the oven until the plastic within the molds gels and fuses and the assembly is then moved into a cooling chamber 27. The cooling chamber is conveniently provided with water sprays for reducing the temperature of the molds and frame members so that the frame members can be opened at 28 to remove the molded articles. A convenient conveying means such as a track 29 is provided for production manufacture to easily transport the assembly through the various process stations.

The frame members are constructed so as to afford uniform clamping pressure to the molds and withstand successive heating and cooling stages without distorting. As illustrated in FIGURES 1 and 3, the frame member 10 is formed of a plurality of sections with each section being substantially rigid and with the sections yieldably and elastically interconnected. The frame members 9 and 10 are substantially the same in construction and therefore only frame member 10 will be described in detail.

The frame member 10 has rigid sections 10a, 10b and 10c. Each of the sections is substantially identical in construction to provide a uniform overall frame and the frame includes a plurality of radially extending bars or arms 30, 31, 32 and 33 which comprise the radial bars for the section 10a. The bars are interconnected at their inner ends such as by being secured to the hub 18. At their outer ends the radial bars are secured to a circumferentially extending arcuate bar 34 which serves only the section 10a. Between the radial bars are cross bars such as 35 between the radial bars 30 and 31, 36 between the radial bars 31 and 32, and 37 between the radial bars 32 and 33. The cross bars are preferably positioned as illustrated both for strength and convenience of positioning the support members 16 and 17 and the locking members 15. Additional short radial bars 38 are located at the outer edges of the sections extending between the outermost cross bars and the arcuate bar 34. In the arrangement as shown, more cross bars are utilized between the radial bars 30 and 31 and the radial bars 32 and 33 at the edges of the sections. Near the center of the frame short connecting bars 39 are located conveniently positioned for additional support members for mounting and clamping the molds.

The sections are interconnected to each other in an elastically yieldable manner so as to permit relative shifting of the frame member sections. The sections of the frame member are arranged so that sections of each frame member are opposite the sections of the other frame member with a mold between each pair of sections. The sections of each frame member are joined to each other at their peripheral upper edge by an elastically resilient yieldable U-shaped connector 40. The connector is constructed so that the sections are firmly interrelated during handling and during the molding operations but are not rigidly restrained so that each of the molds can be individually supported and clamped together in accordance with its requirement. This construction of the frame members also relieves the stresses which would be set up due to heating of the frame members and molds during the molding process thereby preventing any strain on the mold which would cause the sections to open. The tendency to distort is severe both in the heating and the rapid cooling processes.

Figure 2:
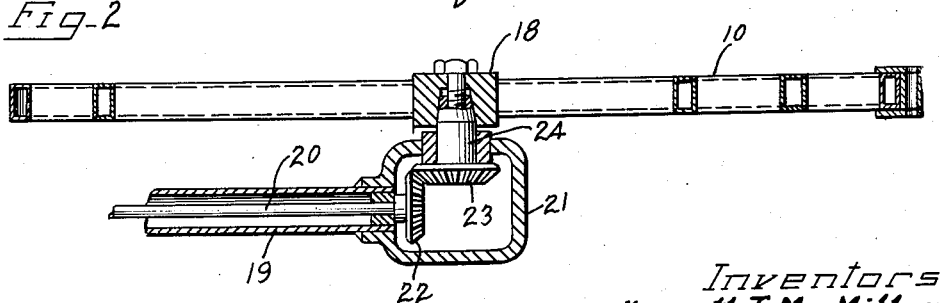
FIGURE 2 is a vertical sectional view taken substantially along line II—II of FIGURE 1.

The rods which form the individual sections of the frame are tubular in shape with the ends of each of the tubular rods being closed so as to lock air therein which prevents the entry of water in the cooling chamber. The tubular rods are preferably rectangular in shape and are deeper than they are wide, as illustrated in FIGURE 2. This not only affords strength to the frame member but the frame member heats rapidly so as not to retard the uniform heating of the mold in the heating chamber, and it cools rapidly so that the process can be carried out more rapidly and danger of burning personnel when unloading the molds is avoided.

As illustrated in FIGURE 7, the guide members include a rod 41 rigidly secured to the lower frame 10 and a rod receiving socket member 42 secured to the upper frame member 9. The depth of insertion of the rod into the socket member is limited by a collar 43 locked to the rod by a set screw 44.

As may be observed in FIGURE 1, the guide members 14 are unequally spaced from each other around the periphery of the frame member so that the frame members will not fit together unless they are in the properly rotated or oriented position.

As illustrated in FIGURE 4, the rod 41 and the socket member 42 are of such a length that they engage each other before a threaded bolt 47 of the locking member 15 reaches the top of the mold section 13b. This prevents the bolt 47 from damaging the edge or the inner surface of the mold 13 when the frame members are brought together. The guide members of course will guide the frame members to a position so that the bolt 47 will be out of alignment with the molds.

As illustrated in FIGURE 6, the locking members 15 include the bolt 47 rotatably mounted in a fitting 48 on the upper frame member 9. The bolt is threaded down into a post 45 which is internally threaded at 46 at its upper end and which is mounted on the lower frame member 10. Acme threads may be employed for continued reuse and the bolt 47 may be of brass so that it will incur the wear and can be replaced, and so that a lubricant need not be employed.

As illustrated in FIGURE 9, the mold sections are supported on the frame members by bolts 50 mounted in fittings 49 on the frame members and the molds such as 13 have internally threaded holes 51 to receive the mounting bolts 50.

As illustrated in FIGURE 8, the mold sections are clamped together at their edges by the application of pressure through pressure bolts 52 threaded into fittings 53 on the frame members. The bolts engage pressure distribution plates 54 fitted over bosses on the molds such as 13 to prevent the pressure bolts from digging into the relatively soft metal of the molds.

For reference purposes and because their function is somewhat similar, the clamping members and the pressure members are herein generically referred to as supports for the mold.

In operation, the operator separates the mold sections by lifting the top frame member 9 and places a measured amount of plastisol in each of the molds. The upper frame member is lowered onto the lower frame member in the manner illustrated in FIGURE 4 with the guide members 14 guiding the frame members to oriented position and the locking members 15 are then tightened. The molds have been previously connected to the frame members by the mounting members 17 and the pressure members 16 have been previously adjusted. The assembled frame members and molds are then rotated about plural axes, supported on the arm 19 and carried through the heating chamber 26 and cooling chamber 27, FIGURE 5, after which the frame members may be opened and the completed molded articles removed.

Thus it will be seen that we have provided an improved molding apparatus which meets the objectives and advantages hereinbefore set forth. The structure of the frame members and their interrelation is especially well suited to molding articles from thermoplastic by the method referred to.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a molding apparatus for casting plastic articles from a thermoplastic material, opposed frame members for clamping a plurality of molds therebetween during heating and cooling of the molds, said frame members each formed in sections with each section being substantially rigid and with the rigid sections in each frame member arranged in opposed relationship, mold supporting members on each of said sections for supporting individual molds between the sections of the frame members, means for releasably holding said frame members in a fixed opposed relationship in molding position, and yieldable means connected between adjacent rigid sections of each of the frame members to accommodate limited relative movement between said sections in molding position.

2. In a molding apparatus for casting plastic articles from a thermoplastic material, opposed frame members for clamping and applying a closing pressure to a plurality of molds therebetween, said frame members formed in sections with each section being substantially rigid, mold supporting members between opposing sections of the opposing frame members for supporting individual molds between opposed frame member sections, means for fixing the position of the frame members in a molding position with the molds held closed, and yieldable means connected between adjacent rigid sections in each frame member to accommodate limited relative movement between said sections in molding position.

3. In a molding apparatus for casting plastic articles from a thermoplastic material, opposed frame members for clamping a plurality of molds therebetween and for applying a closing pressure to the plurality of molds, said frame members formed in sections with each section being substantially rigid and attached to the other sections at a radial center of each of the frame members, mold supporting members on each section of the frame members for supporting individual molds between sections of the opposing frame members with the molds arranged radially from the center of the frame members and circumferentially spaced, means for fixing the position of the frame members in a molding position with the molds held closed, and circumferentially spaced elastically yieldable connectors between each of the frame sections of each frame member to accommodate relative movement between said sections in molding position.

4. In a molding apparatus for casting plastic articles from a thermoplastic material, opposed frame members for applying a closing pressure to a plurality of molds therebetween during heating and cooling of the molds, said frame members each formed in sections with each section being substantially rigid and with the rigid sections in each frame member arranged in opposed relationship, each of said frame member sections having a plurality of bars extending radially from the center of the frame member with the inner ends of the bars interconnected and with the outer ends connected to an arcuate bar, cross bars rigidly interconnecting the radial bars of each of the frame member sections, mold supporting members on each of said sections for supporting individual molds between the sections of the frame members, means for releasably locking said frame members in a fixed opposed relationship in molding position, and elastically yieldable means connected between adjacent rigid sections of each of the frame members to accommodate limited relative movement between said sections in molding position.

5. In a molding apparatus for casting plastic articles from a thermoplastic material, opposed frame members for applying a closing pressure to a plurality of molds therebetween during heating and cooling of the molds, said frame members each formed in sections with each section being substantially rigid and with the rigid sections in each frame member arranged in opposed relationship, each of said frame member sections having a plurality of bars extending radially from the center of the frame member with the inner ends of the bars interconnected and with the outer ends connected to an arcuate bar, cross bars rigidly interconnecting the radial bars of each of the frame member sections, mold supporting members on each of said sections for supporting individual molds between the sections of the frame members, means for releasably locking said frame members in a fixed opposed relationship in molding position, and U-shaped relatively resilient connectors secured between said frame member sections at the radial outer ends thereof to accommodate limited relative movement between said sections in molding position.

6. In a molding apparatus for casting plastic articles from a thermoplastic material, a pair of opposed frame members for applying a closing pressure to a plurality of molds held therebetween during heating and cooling of the molds, said frame members each formed in sections with each section being substantially rigid and with the rigid sections in the frame members arranged in opposed relationship, each of said frame member sections having a plurality of bars extending radially from the center of the frame member with the inner ends of the bars interconnected and with the outer ends connected to an arcuate bar, cross bars rigidly interconnecting the radial bars of each of the frame member sections, adjustable mold supporting members mounted on the bars and threaded for adjustment in an axial direction relative to the frame members to adjustably regulate the closing pressure applied to molds between the frame members, means for releasably locking said frame members in a fixed opposed relationship in a molding position, and elastically yieldable means connected between adjacent rigid sections of the frame members to accommodate limited relative movement between said sections in molding position.

7. In a molding apparatus for casting plastic articles from a thermoplastic material, opposed frame members for applying a closing pressure to a plurality of molds therebetween during heating and cooling of the molds, said frame members each formed in sections with each section being substantially rigid and with the rigid sections in the frame members arranged in opposed relationship, each of said frame member sections having a plurality of bars extending radially from the center of the frame member with the inner ends of the bars interconnected and with the outer ends connected to arcuate bars, cross bars rigidly interconnecting the radial bars of each of the frame member sections, mating guide members connected to each of the frame members for positioning the frame members in aligned position relative to molds between the frame members in a molding position, locking means on the frame members for locking the frame members together and holding them in the molding position, and elastically yieldable connectors between each of the frame sections spaced radially outwardly of the center of the frame members to accommodate limited relative movement between said sections in molding position.

8. In a molding apparatus for casting plastic articles from a thermoplastic material, a pair of opposed frame members for applying a closing pressure to a plurality of molds therebetween during heating and cooling of the molds, said frame members each formed in sections with each section being substantially rigid and with the rigid sections in the frame members arranged in opposed relationship, each of said frame member sections having a plurality of hollow tubular bars extending radially from the center of the frame member with the inner ends of the bars interconnected and with the outer ends connected to a circumferentially extending bar for each section, hollow tubular rectangular cross bars rigidly interconnected between the radial bars of each of the frame member sections, each of said bars closed at the ends to prevent the entry of water during a cooling operation and to lock insulating air therein, mold supporting members on each section of the frame member for supporting individual molds by each frame member section, means for fixing the position of the frame member in a molding position with the molds held closed, and yieldable means connected between adjacent sections of each of the frame members to accommodate limited relative movement between said sections in molding position.

9. In a molding apparatus for casting plastic articles from a thermoplastic material, a pair of opposed frame members for applying a closing pressure to a plurality of molds therebetween during heating and cooling of the molds, said frame members each formed in sections with each section being substantially rigid and with the rigid sections in the frame members arranged in opposed relationship, mold sections for each of the sections of the frame members formed of a relatively soft material, support members threaded into each section of the frame members for engaging a mold section, a pressure distributing member between each of the support members and the mold sections supported thereby, and yieldable means connected between adjacent rigid sections of each of the frame members to accommodate limited relative movement between said sections in molding position.

10. In a molding apparatus for casting plastic articles from a thermoplatsic material, opposed frame members for applying a closing pressure to a plurality of molds therebetween during heating and cooling of the molds, said frame members each formed in sections with each section being substantially rigid and with the rigid sections in the frame members arranged in opposed relationship, each of said frame member sections having a plurality of bars extending radially from the center of the frame member with the inner ends of the bars interconnected and with the outer ends connected to circumferentially extending bars for each section, cross bars rigidly interconnecting the radial bars of each of the frame member sections, mold supporting members on each of said sections for supporting individual molds between the frame members, means for releasably locking said frame members in fixed opposed relationship in a molding position, yieldable means connected between adjacent rigid sections of each of the frame members to accommodate limited relative movement between said sections in molding position, a heating chamber for heating the molds to set the plastic therein, a cooling chamber for cooling the molds to remove the molded material therefrom, a conveyor for supporting said frame members and carrying them through said chambers, and a rotatable carrier rotating the frame members simultaneously about plural axes on the conveyor while the frame members are moved through the heating chamber.

References Cited in the file of this patent

UNITED STATES PATENTS

| | | |
|---|---|---|
| 1,900,456 | Mead | Mar. 7, 1933 |
| 2,262,143 | Kelm | Nov. 11, 1941 |
| 2,298,057 | Kelm | Oct. 6, 1942 |
| 2,909,807 | Matsuda | Oct. 27, 1959 |
| 2,926,388 | Gabler et al. | Mar. 1, 1960 |
| 2,932,854 | Statina | Apr. 19, 1960 |
| 2,964,791 | MacFarland | Dec. 20, 1960 |

OTHER REFERENCES

Zweig: "Rotational Molding of Plasticols," Modern Plastics, September 1955.